United States Patent Office 3,225,732
Patented Dec. 28, 1965

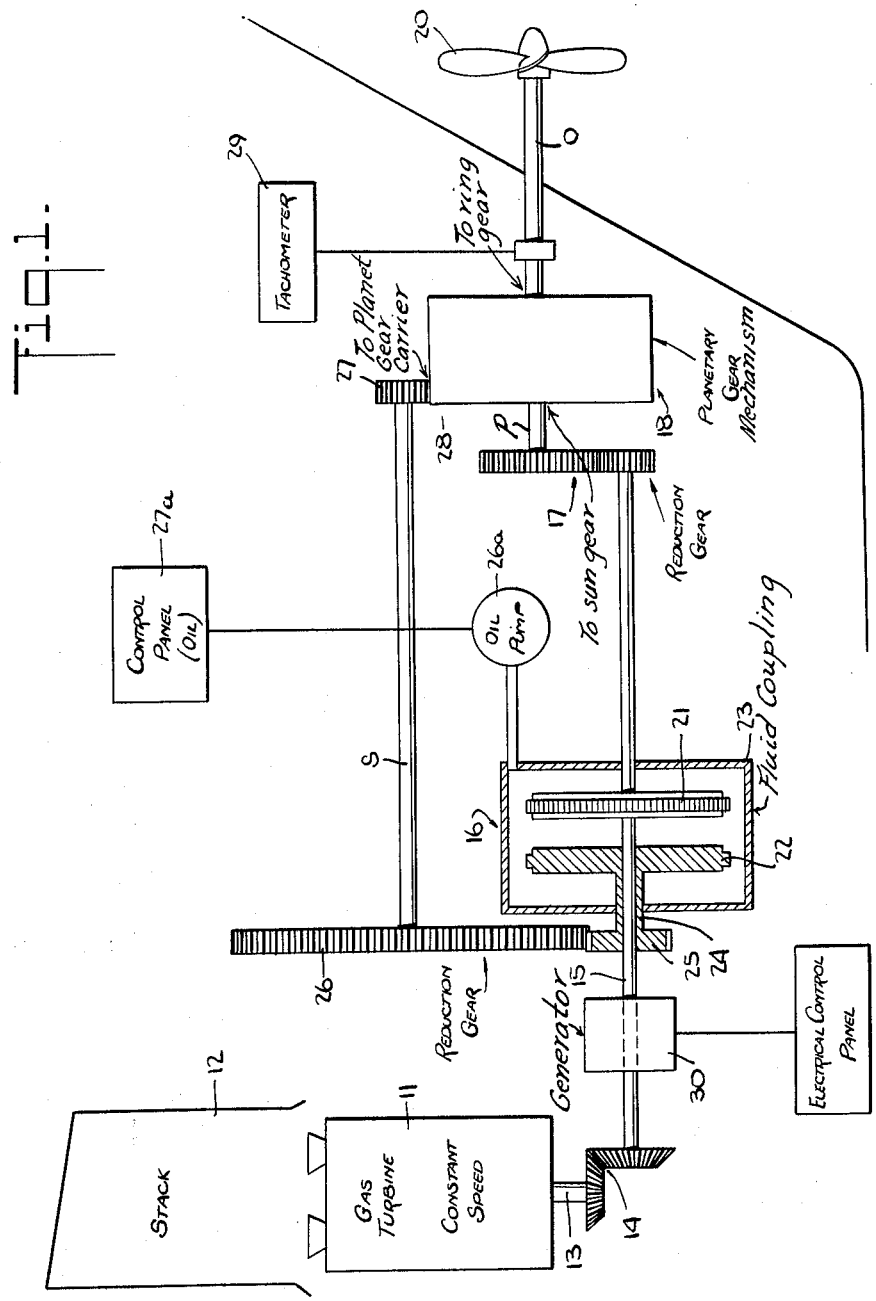

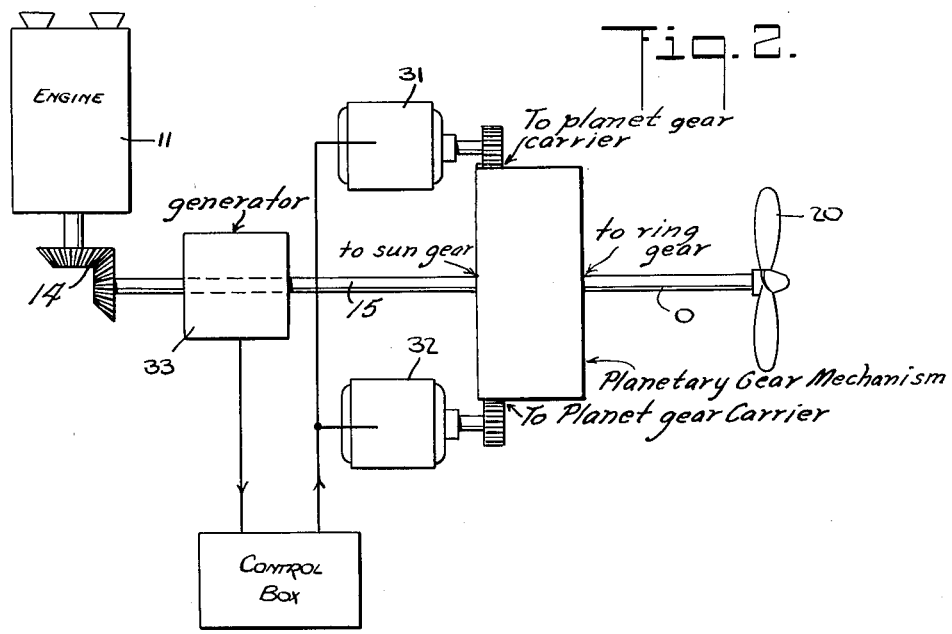

3,225,732
REVERSIBLE MARINE PROPULSION SYSTEM
Kurt Carlsen, 65 Alwat St., Woodbridge, N.J.
Filed May 11, 1962, Ser. No. 193,969
7 Claims. (Cl. 115—.5)

The present invention relates generally to marine propulsion systems, and more particularly to a power transmission arrangement for coupling a no-reversing engine to a marine propeller and for governing the movement of said propeller from full ahead to full astern with any value of intermediate speed.

Power turbine engines for marine use now include gas and jet-operated engines. Such engines are adapted to function most efficiently when at a constant high speed. It is therefore customary to connect the propeller to the ship's engine through suitable reduction gears. As a practical matter, it has been found necessary in such gearing, when used in conjunction with engines of considerable power, to maintain the gears permanently in mesh, and to minimize or avoid the use of clutches, brakes and gear reversing mechanisms. For this reason, the problem of obtaining astern motion has presented serious difficulties in engine design.

It is not generally feasible to reverse the ship's engine, for this is an awkward and time-consuming operation, and where a rapid reverse is necessary, as in cases of an emergency, this method has obvious drawbacks. On the the other hand, the practice of providing an auxiliary reversing engine is not only costly but also takes up additional space. Accordingly, it is the principal object of this invention to provide a simple and efficient system of marine propulsion, in which ahead and astern motion is carried out without reversing the ship's engine and without using an auxiliary revresing engine.

More specifically, it is an object of the invention to provide a transmission system for operatively coupling a high-speed engine to a marine propeller and for reducing the speed thereof, said system making use of gears which are always in mesh, and yet making it possible to control the movement of the propeller in a range from full-ahead through stop to full-astern with any value of intermediate speed.

A significant feature of the invention is that it is adapted to propel a ship using as the driving power a single non-reversing, high-speed gas turbine operating at optimum efficiency at a constant speed.

Yet another object of the invention is to provide a power transmission system in which no component thereof can run away during a change from forward to reverse operation.

It is a further object of the invention to provide a system in which complete control of propeller movement can be effected directly from the bridge of the ship without intermediate control operations.

Also an object of the invention is to provide a marine propulsion system making use of a turbine engine which runs at a constant speed at all times and acts continuously to drive an electrical generator, thereby permitting shut-down of the port or auxiliary generators during the sea passage.

Briefly stated, these objects are accomplished by an arrangement wherein the high-speed gas turbine constituting the primary drive source, is operatively coupled through a gear reduction unit and a differential or planetary gear train to the ship's propeller, the differential gear train being also driven from a secondary drive source, derived from the primary source of from an auxiliary motor, at a rate producing a propeller motion in a direction and at a speed proportional to the difference between the primary and secondary sources.

For a better understanding of the invention as well as other objects and further features thereof, reference is made to the following detailed description to be read in conjunction with the accompanying drawing, wherein:

FIG. 1 is a schematic diagram of one preferred embodiment of a marine propulsion system in accordance with the invention;

FIG. 2 is a schematic diagram of a second preferred embodiment of the invention.

Referring now to the drawing, and more particularly to FIG. 1, there is shown a vessel 10 having a power plant including a vertically mounted jet or gas-operated turbine engine 11. The turbine engine is driven in the usual manner by combustion products, while exhaust gases pass directly into the ship's stack 12. Thus there is no need in this arrangement for expensive duct work leading to the stack, as would be the case in a horizontally mounted engine.

The engine is non-reversing and operates at a high constant speed for optimum efficiency. The output shaft 13 of the engine is coupled through bevel gears 14 to a horizontally mounted high-speed transmission shaft 15 which passes through a fluid coupling, generally designated by numeral 16, to drive a standard marine gear reduction unit 17. The gear reduction unit 17 is coupled by a primary input shaft P through a planetary or epicycle gear train, generally designated by numeral 18, to the propeller output shaft O, input shaft P being connected to the sun gear of the planetary gear train. Output shaft O extends through the hull of the ship and terminates in marine propeller 20.

Fluid coupling 16 is constituted by a driving turbine 21 and a driven turbine 22, the turbines being formed of curved vanes. The two turbines are mounted in axial aligment within an oil box 23 surrounding the high-speed shaft 15, driving turbine 21 being keyed to the shaft and rotating therewith, and driven turbine 22 being mounted on a tubular shaft 24 which is coaxial with shaft 15 and extends outside the box to terminate in a pinion gear 25 also coaxial with the shaft 15. Oil is supplied to the box 23 or is drained therefrom by an oil pump 26 whose operation is controlled electrically from a control panel 27 which may be located in the bridge of the vessel.

The two turbines 21 and 22 are physically separated from each other in the box and a coupling therebetween is effected only when oil is introduced in the box. Maximum coupling exists when the box is filled, and zero coupling when it is fully drained. Thus the fluid coupling may be controlled from the bridge, from a fully energized condition when the box is filled with oil, to a completely deenergized condition when oil is entirely drained from the box. Intermediate turbine speeds in the fluid coupling are obtained by varying this oil supply.

Pinion gear 25 of the fluid coupling engages a main gear 26 attached to one end of a secondary input shaft S, the other end of this shaft terminating in a pinion gear 27 which intermeshes with the carrier of the planet gears of the planetary train 18. The nature of the planetary gear train 18 is such that the direction and speed of the output shaft O coupled to the ring gear thereof depends on the relative speeds of the primary and secondary shafts P and S operatively coupled to the input thereof.

Gears 25 and 26 constitute a gear reduction train and their ratio matches the ratio of gear reduction unit 17. Hence when the gear 25 is rotated at the same rate as high-speed shaft 15, and this occurs only when the fluid coupling is fully energized, the primary and secondary shafts P and S will turn at exactly the same speeds. For less energization of the fluid coupling, the speed of the secondary shaft S will decrease accordingly, but the primary shaft will continue to rotate at constant high speed.

Thus in the embodiment of FIG. 1, the marine propulsion system makes use of a jet-operated gas turbine engine which is vertically mounted in the vessel, with its gas exhaust going directly into the stack, thereby obviating the need for special ducts, as would be necessary if the engine were supported horizontally as in aircraft applications. The gas turbine operates at a constant speed in a single rotary direction.

In order to obtain astern motion of the vessel as well as forward motion at different speeds, without the use of clutches or gear-reversing mechanism, the gas turbine is connected via primary shaft P to one input of the planetary gear 18, namely to the sun gear therein, whereas coupled to the other input (the planet gear carrier) is the secondary shaft S which is driven through the fluid coupling 16 at a speed determined by the setting of the coupling. The output shaft O for the propeller is coupled to the output of the planetary gear, namely the ring gear thereof.

Thus one output shaft P of the planetary gear or gear differential mechanism is driven at a constant speed by the gas turbine input, whereas the other input shaft S is driven at a speed which may be varied relative to engine speed by means of the fluid coupling. By adjustment of this relative speed, the output shaft O may be caused to operate faster or slower, or to stop or to reverse.

It will be seen therefore, that the output shaft may be brought to a halt without a braking action and without stopping the main engine, and that the propeller may be reversed without shifting gears or clutch actions. This control may be carried out from the bridge of the vessel.

The speed of the propeller may be indicated by a tachometer 29 coupled to output shaft O. Since the turbine engine 11 runs at a constant speed at all times, an alternator or generator 30 may be directly coupled to high-speed shaft 15 and driven thereby, thus making it feasible to shut down the port or auxiliary generator of the vessel during sea passage.

In FIG. 2, there is shown another embodiment of the invention in which similar results are realized without a fluid coupling. In place of this fluid coupling, two heavy-duty marine propulsion type motors 31 and 32 are reduction-geared to the carrier of planet gears 28 of the planetary gear train. These motors, which effectively constitute a secondary power source for the planetary gear, as against the primary source provided by high-speed shaft 15, are energized by a heavy-duty generator 33 directly coupled to primary shaft 15. Primary shaft 15 is coupled to the sun gear of the planetary gear 18. The motors are controlled by an electrical control box 34 interposed between the generator and the motors and located in the bridge of the vessel. The relative speeds of the secondary and primary power sources determine whether the output shaft operates in the forward or reverse direction and at intermediate speed values, very much as in the case of the operation of FIG. 1.

While preferred embodiments of the invention have been disclosed, it is to be understood that many changes and modifications may be made therein without departing from the essential spirit thereof as set forth in the annexed claims.

What is claimed is:
1. A marine propulsion system for operating the propeller of a vessel having a stack, said system comprising a gas turbine engine rotating at a constant rate in one direction and mounted vertically in said vessel for gas exhaust into said stack, a planetary gear assembly, means including a primary input shaft extending at right angles to the vertical axis of said engine coupling said engine to one input of said assembly, a secondary power source operatively coupled to said engine and including adjustable means to produce an output whose speed varies from zero to a speed corresponding to said constant speed, means including a secondary input shaft coupling said secondary source to another input of said planetary gear assembly to produce an output whose direction and speed may be varied in accordance with said adjustment of said secondary source, and an output shaft coupling said assembly to said propeller.

2. A system as set forth in claim 1, wherein said secondary source is constituted by an adjustable fluid coupling coupled to said engine to provide an output depending on the degree of fluid coupling.

3. A system as set forth in claim 2, wherein said fluid coupling comprises a driving turbine coupled to said engine and a driven turbine coupled to said input of said assembly, said turbines being mounted within an oil box, and control means to vary the amount of oil in said box and thereby vary the degree of unit coupling.

4. A system as set forth in claim 3, wherein said control means includes an oil pump communicating with said box and a control panel therefor in the bridge of said vessel.

5. A system as set forth in claim 3, wherein said engine is a jet-operated turbine engine.

6. A system as set forth in claim 5, wherein said engine is provided with an exhaust for combustion gas and is vertically mounted for direct exhaust into the stack of said vessel.

7. A system as set forth in claim 1, wherein said secondary power source is constituted by an electrical generator driven by said engine and a control member for varying the electrical output thereof, and an electrical motor energized by said generator and operatively coupled to said secondary input shaft.

References Cited by the Examiner

UNITED STATES PATENTS

| 1,899,963 | 3/1933 | Holzwarth | 60—39.15 |
|---|---|---|---|
| 1,954,822 | 4/1934 | Low | 74—686 |
| 2,374,303 | 4/1945 | Osborne | 115—.5 |
| 2,390,240 | 12/1945 | De Lancey | 74—687 |
| 2,890,600 | 6/1959 | Smirl et al. | 74—677 |
| 3,016,772 | 1/1962 | Hornbostel | 74—675 X |

FOREIGN PATENTS

| 331,487 | 6/1930 | Great Britain. |
| 1,122,967 | 5/1956 | France. |

MILTON BUCHLER, *Primary Examiner.*

ANDREW H. FARRELL, *Examiner.*